(12) United States Patent
Morszeck

(10) Patent No.: US 10,568,399 B2
(45) Date of Patent: Feb. 25, 2020

(54) STORAGE DEVICE WITH THREE-DIMENSIONAL PROTRUSIONS ON THE OUTER SURFACE

(71) Applicant: Rimowa GmbH, Cologne (DE)

(72) Inventor: Dieter Morszeck, Cologne (DE)

(73) Assignee: Rimowa GmbH, Cologne (DE)

( * ) Notice: Subject to any disclaimer, the term of this patent is extended or adjusted under 35 U.S.C. 154(b) by 150 days.

(21) Appl. No.: 14/777,817

(22) PCT Filed: Mar. 28, 2014

(86) PCT No.: PCT/EP2014/056266
§ 371 (c)(1),
(2) Date: Sep. 17, 2015

(87) PCT Pub. No.: WO2014/154855
PCT Pub. Date: Oct. 2, 2014

(65) Prior Publication Data
US 2016/0286912 A1   Oct. 6, 2016

(30) Foreign Application Priority Data

Mar. 28, 2013  (DE) .................... 20 2013 002 980 U

(51) Int. Cl.
*A45C 5/00* (2006.01)
*A45C 5/02* (2006.01)
(Continued)

(52) U.S. Cl.
CPC .................. *A45C 5/02* (2013.01); *A45C 1/02* (2013.01); *A45C 5/03* (2013.01); *A45C 13/08* (2013.01);
(Continued)

(58) Field of Classification Search
CPC .. A45C 1/02; A45C 5/03; A45C 13/08; A45C 13/26; A45C 1/06; A45C 2005/037;
(Continued)

(56) References Cited

U.S. PATENT DOCUMENTS

| | | | | | |
|---|---|---|---|---|---|
| 290,466 | A | * | 12/1883 | Peck ..................... | A47B 95/043 248/345.1 |
| 358,012 | A | * | 2/1887 | Bray ....................... | A45C 5/02 190/24 |

(Continued)

FOREIGN PATENT DOCUMENTS

| | | |
|---|---|---|
| CN | 201064252 Y | 5/2008 |
| CN | 201175550 Y | 1/2009 |

(Continued)

OTHER PUBLICATIONS

Today I Found Out, The Narual Color of Rubber is White, Dec. 12, 2011 (Year: 2011).*

(Continued)

*Primary Examiner* — Tri M Mai
(74) *Attorney, Agent, or Firm* — Maier & Maier, PLLC

(57) ABSTRACT

In a storage device, particularly a piece of baggage or a purse, comprising at least one outer surface, wherein the at least one outer surface has arranged on it at least one three-dimensional protrusion extending from the outer surface, it is provided that the three-dimensional protrusion extending from the outer surface includes at least two mutually superimposed and interconnected layers.

13 Claims, 4 Drawing Sheets

(51) Int. Cl.
  *B32B 3/30* (2006.01)
  *A45C 5/03* (2006.01)
  *A45C 13/08* (2006.01)
  *B32B 9/04* (2006.01)
  *B32B 27/08* (2006.01)
  *B32B 27/28* (2006.01)
  *B32B 9/00* (2006.01)
  *A45C 1/02* (2006.01)
  *A45C 13/26* (2006.01)
  *A45C 1/06* (2006.01)

(52) U.S. Cl.
  CPC ............... *A45C 13/26* (2013.01); *B32B 3/30* (2013.01); *B32B 9/005* (2013.01); *B32B 9/04* (2013.01); *B32B 27/08* (2013.01); *B32B 27/283* (2013.01); *A45C 1/06* (2013.01); *A45C 2005/037* (2013.01); *B32B 2250/44* (2013.01); *B32B 2439/00* (2013.01); *B32B 2439/40* (2013.01); *B32B 2439/46* (2013.01)

(58) Field of Classification Search
  CPC ......... B32B 27/283; B32B 3/30; B32B 9/005; B32B 9/0427; B32B 9/08; B32B 2250/44; B32B 2439/00; B32B 2439/40; B32B 2439/46
  See application file for complete search history.

(56) References Cited

U.S. PATENT DOCUMENTS

| | | | | |
|---|---|---|---|---|
| 371,554 A * | 10/1887 | Crouch | ............... | A45C 5/02 190/24 |
| 444,736 A * | 1/1891 | Topham | ............... | A45C 5/02 190/25 |
| 491,018 A * | 1/1893 | Krenkel | ............... | A45C 5/02 190/40 |
| 3,128,855 A | 4/1964 | Hoffman et al. | | |
| 3,756,165 A * | 9/1973 | Valiela | ............... | B41F 15/0895 101/211 |
| 4,420,103 A * | 12/1983 | Douglass | ............... | A45F 3/04 224/153 |
| 5,018,652 A * | 5/1991 | Holtzclaw, Jr. | ....... | F41C 33/001 224/150 |
| 5,211,302 A * | 5/1993 | Tiramani | ............... | A45C 13/04 206/581 |
| 5,228,546 A | 7/1993 | Chang et al. | | |
| 5,361,955 A * | 11/1994 | Gregory | ............... | A45F 3/04 224/630 |
| 6,122,768 A * | 9/2000 | McCrane | ............... | A41D 13/065 2/16 |
| 6,251,493 B1 * | 6/2001 | Johnson | ............... | F16F 1/37 428/220 |
| 6,256,015 B1 * | 7/2001 | Adler | ............... | G06F 3/039 345/163 |
| 6,357,568 B1 | 3/2002 | Chen | | |
| 6,419,543 B1 * | 7/2002 | Burrows | ............... | A63H 33/38 281/29 |
| 6,775,851 B1 * | 8/2004 | Chen | ............... | A41D 13/0156 2/463 |
| 8,561,956 B2 * | 10/2013 | Tao | ............... | A47B 95/043 248/100 |
| 8,893,940 B2 * | 11/2014 | Green | ............... | A45F 3/08 224/262 |
| 2003/0162001 A1 * | 8/2003 | Rosch | ............... | B29C 45/14811 428/192 |
| 2005/0210912 A1 | 9/2005 | Mogil et al. | | |
| 2007/0296117 A1 | 12/2007 | Taeye et al. | | |
| 2011/0177303 A1 * | 7/2011 | Suehiro | ............... | B44C 3/02 428/195.1 |

FOREIGN PATENT DOCUMENTS

| | | |
|---|---|---|
| CN | 202213407 U | 5/2012 |
| CN | 202407507 U | 9/2012 |
| DE | 29904675 U1 | 7/1999 |
| DE | 10 2005 006 541 A1 | 8/2006 |
| DE | 102005006541 A1 | 8/2006 |
| JP | H06-46911 A | 2/1994 |
| JP | 2012-213471 A | 11/2012 |
| WO | 98/16131 A1 | 4/1998 |
| WO | 2007-014804 A1 | 2/2007 |
| WO | 2013/006294 A1 | 1/2013 |

OTHER PUBLICATIONS

Singapore Written Opinion dated Feb. 13, 2017, in connection with corresponding SG Application No. 11201507911X (7 pgs.).
Taiwanese Office Action dated Mar. 16, 2017, in connection with corresponding TW Application No. 10620281330 (1 pg.).
Australian Office Action dated Sep. 1, 2017, in connection with corresponding AU Application No. 2014242950 (6 pgs.).
"Paisley St. Claire: Suitcases pimped and packed", Sep. 21, 2009, retrieved from the Internet: URL: http://paisleystclaire.typepad.com/main/2009/09/suitcases-pimped-and-packed.html [retrieved on Sep. 14, 2015]; 3pgs.
International Search Report in corresponding PCT/EP2014/056266 dated Jul. 25, 2014; 6pgs.
Office Action dated May 8, 2018 in corresponding Japanese Application No. 2016-504689; 6 pages including English-language translation.
Office Action dated Apr. 13, 2018 in corresponding Australian Application No. 2014242950; 3 pages.

\* cited by examiner

STORAGE DEVICE WITH THREE-DIMENSIONAL PROTRUSIONS ON THE OUTER SURFACE

BACKGROUND OF THE INVENTION

Field of the Invention

The present invention relates to a storage device, particularly a piece of baggage or a purse, according to the precharacterizing part of claim 1.

Description of the Prior Art

Storage devices, such as e.g. a suitcase or a bag, can comprise three-dimensional protrusions on the outer surface. The three-dimensional protrusions can be rib-shaped and respectively groove-shaped. In suitcase shells made of plastic, such rib- and respectively groove-shaped protrusions will be molded during the production process of the suitcase shell itself.

It is however desired that such three-dimensional protrusions arranged on the outer surfaces of storage devices can be produced in a particularly simple and inexpensive manner.

It is an object of the invention to provide a storage device having at least one of its outer surfaces provided with three-dimensional protrusions that can be produced in the most simple and inexpensive manner.

SUMMARY OF THE INVENTION

The above object is achieved by the features defined in claim 1. The invention advantageously provides that the at least one three-dimensional protrusion extending from the outer surface comprises at least two mutually superimposed and interconnected layers.

This has the advantage that the three-dimensional protrusions can be produced independently from the production of the outer surface. In this manner, the three-dimensional protrusions can be produced in a simple and inexpensive manner, while the shape of the three-dimensional protrusions is variable.

The at least one protrusion can be rib-shaped.

The protrusion extending from the outer surface can be formed of at least two mutually superimposed and interconnected layers.

The layers of the at least one protrusion can be printed. Thus, different shapes of protrusions can be produced in a very fast and simple manner.

The at least one protrusion can comprise more than three mutually superimposed and interconnected layers which preferably are printed onto each other.

The layers can consist of a material which comprises silicone and/or a ceramic paste.

The individual layers can have different widths.

That layer of the at least one protrusion which is adjacent to the outer surface can be the lowermost layer, and the layer of the protrusion which is most remote from the outer surface can be the uppermost layer, wherein the layers have different widths and the lowermost layer is wider than the uppermost layer.

The widths of a plurality of mutually superimposed layers decrease, preferably continuously, from the lowermost layer to the uppermost layer.

The layers can be printed by offset printing or screen printing or by a 3D printing method.

It can be provided to arrange a plurality of said protrusions on the outer surface, which preferably are positioned on the outer surface with uniform distribution.

The rib-shaped protrusion can have a varying and respectively variable height in the longitudinal direction of the rib-shaped protrusions, wherein the central area of the rib-shaped protrusion is higher than the edge areas of the rib-shaped protrusion.

The layer thicknesses of the rib-shaped protrusions can vary in the longitudinal direction of the rib-shaped protrusion. This means that the respective individual layers can have different colors.

The colors of the individual layers of the protrusion can vary.

It is possible to provide an additional outer layer which is arranged on the protrusions and preferably also on the outer surface of the storage device.

Said additional outer layer can comprise at least one three-dimensional protrusion, applied by means of a thermoforming method, which is adapted to the at least one three-dimensional protrusion arranged on the outer surface. The additional outer layer can consist of plastic, leather or a textile material.

The storage device can be a piece of baggage comprising two major surfaces and four lateral surfaces, wherein at least one of the major surfaces comprises rib-shaped protrusions and wherein the longitudinal direction of the rib-shaped protrusion extends parallel to the longitudinal direction of the major surface. Particularly, the storage device can be suitcase.

There can be provided a method for applying at least one protrusion on at least one outer surface of a storage device, particularly a piece of baggage or a purse, said method comprising the following steps:
  applying, particularly impressing, a first layer to the outer surface of an outer wall of a storage device,
  applying, particularly impressing, a second layer to the first layer for forming a three-dimensional protrusion,
  preferably, applying further layers onto the second layer.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
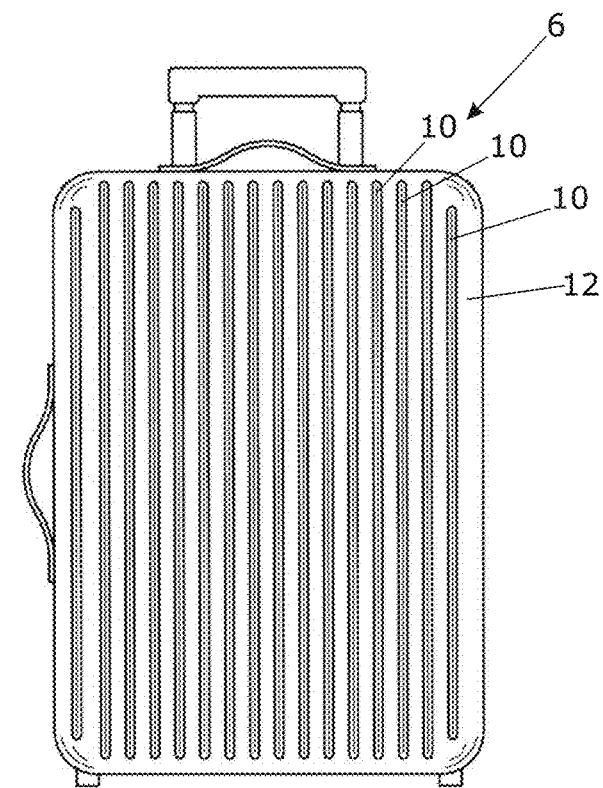
FIG. 1 shows a storage device formed as a piece of baggage, comprising three-dimensional protrusions on the outer surface.

FIG. 1 shows a storage device formed as a suitcase 6. Said suitcase 6 is a piece of baggage. Suitcase 6 comprises at least one outer surface 12 having three-dimensional protrusions 10 arranged on it, said protrusions 10 extending outward relative to said outer surface 12. The three-dimensional protrusions 10 are rib-shaped. The design of the three-dimensional protrusions 10 is illustrated in greater detail in FIGS. 4-8. The suitcase can be a hard-shell suitcase made of aluminum or plastic, e.g. PE.

Figure 2:
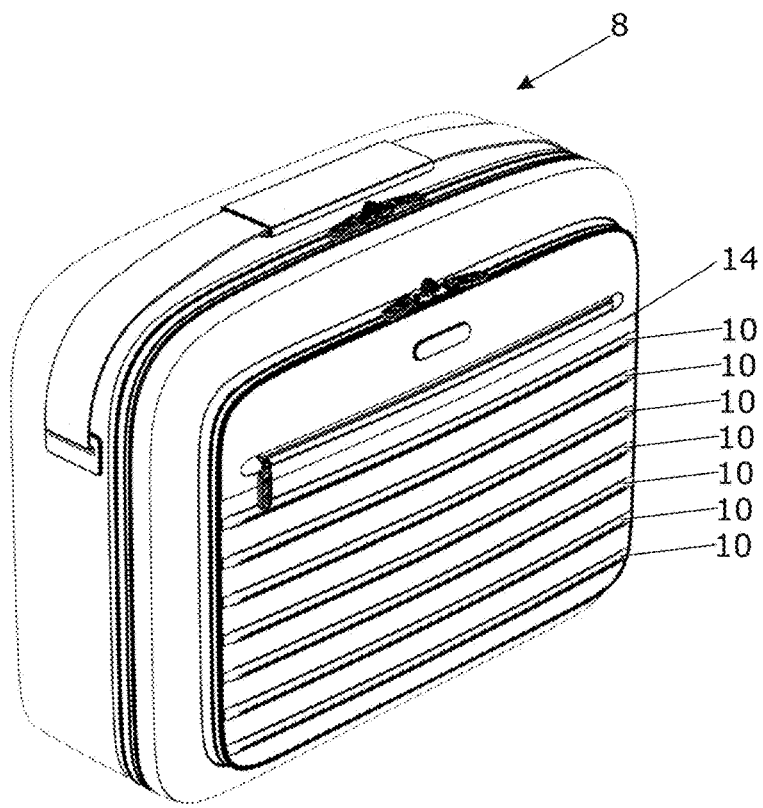
FIG. 2 shows a storage device formed as a bag.

FIG. 2 shows a storage device formed as a bag 8. Said bag 8 comprises at least one outer surface 14 and one outer surface 16 which form the front side and respectively rear side of bag 8. On at least one of said outer surfaces 14, 16, projecting three-dimensional protrusions 10 are arranged.

Figure 3:
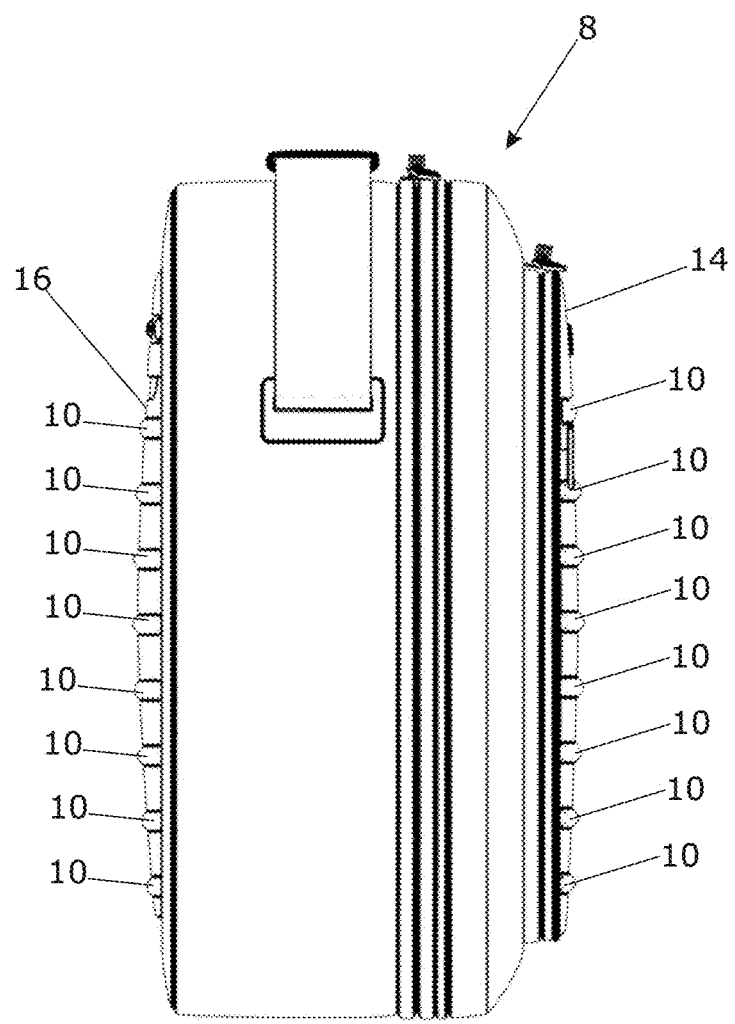
FIG. 3 shows the storage device of FIG. 2 in lateral view.

Said three-dimensional protrusion 10 are rib-shaped. On a given outer surface 14 and respectively 16, a plurality of such three-dimensional protrusions 10 are arranged, the protrusions 10 running parallel next to each other. In FIG. 3, bag 8 is shown in lateral view.

It can be provided that the storage devices shown in FIGS. 1, 2 and 3, i.e. suitcase 6 and bag 8, comprise three-dimensional protrusions 10 only on one of their outer surfaces 12, 14. Alternatively, suitcase 6 and bag 8 can comprise three-dimensional protrusions 10 also on two or more of their outer surfaces.

Preferably, suitcase 6 of FIG. 1 comprises three-dimensional protrusions on all outer surfaces.

Preferably, the respective outer surfaces 12, 14, 16 are provided with a plurality of three-dimensional protrusions 10, wherein these three-dimensional protrusions 10 are preferably rib-shaped, and the rib-shaped three-dimensional protrusions 10 are preferably arranged parallel next to each other and a equal distances to each other. The three-dimensional protrusions 10 can also be arranged on the outer surface of a purse.

The design of the three-dimensional protrusions 10 of the storage device of FIGS. 1-3 is illustrated in greater detail in FIGS. 4-8.

The three-dimensional protrusions 10 comprise at least two mutually super-imposed and interconnected layers. In FIGS. 1-3, the three-dimensional protrusions are merely schematically outlined. For this reason, the individual layers cannot be seen in FIGS. 1-3.

Figure 4:
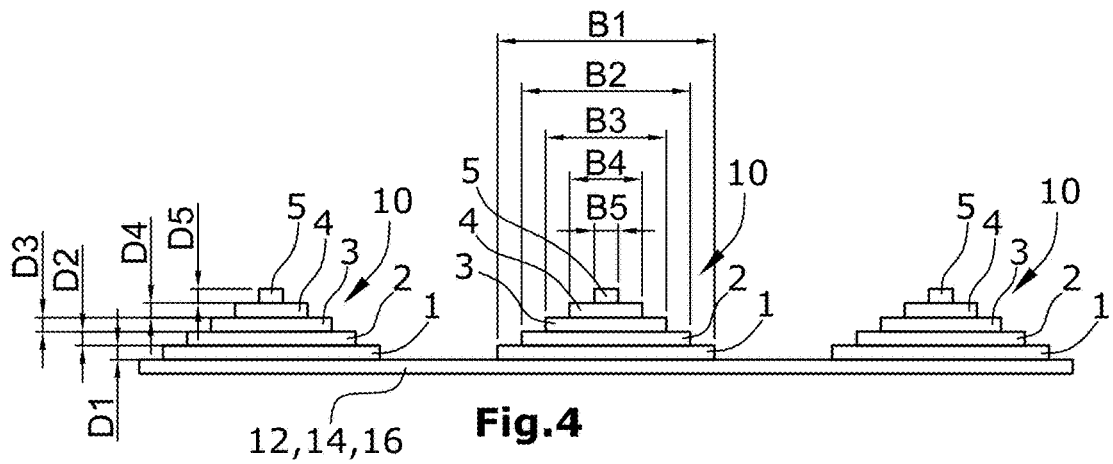
FIG. 4 shows three-dimensional protrusions on the outer surface of a storage device.

FIG. 4 illustrates the three-dimensional protrusions 10. The term "three-dimensional" means that the protrusions have a width B, a height H and a length L. The three-dimensional protrusions 10 are arranged both on the outer surface 12 of suitcase 6 and on the outer surfaces 14, 16 of bag 8. The three-dimensional protrusions 10 comprise five layers 1-5 which are mutually superimposed and are connected to each other. The mutually superimposed and interconnected layers 1-5 can be arranged on the outer surface 12, 14, 16 e.g. by a printing method. For this purpose, the first layer 1 will be printed onto the outer surface 12, 14, 16. This first layer forms the lowermost layer and is the layer adjacent to the outer surface 12, 14, 16. Subsequently, a second layer 2 will be printed onto the first layer 1. Onto the second layer 2, in turn, the third layer 3 will be printed; onto the third layer 3, the fourth layer 4 will be printed; and onto the fourth layer 4, the fifth layer 5 will be printed. In the illustrated embodiment, the fifth layer 5 is the uppermost layer and is the layer arranged at the largest distance from outer surface 12, 14, 16. The three-dimensional protrusion can also comprise a different number of layers.

Since the layers are printed onto the outer surface 12, 14, 16 and the three-dimensional protrusion 10 consists of a plurality of layers 1-5, the three-dimensional protrusion can have any desired shape. Thus, in a production process, the shape and the design of the three-dimensional protrusion 10 can be changed and adjusted as desired.

With preference, the three-dimensional protrusions 10 are formed as rib-shaped protrusions, wherein these rib-shaped protrusions 10 are conically tapering. This is realized in that, as shown in FIG. 4, the mutually superimposed and interconnected layers 1-5 each have a different width. The lowermost layer 1 has the largest width B1. The uppermost layer 5 has the smallest width B5. The width B2-B4 of the intermediate layers 2-4 are each between width B1 and width B5 and are ever more decreasing with each layer so that the width of the three-dimensional protrusions 10 is undergoing a regular decrease with increasing height.

Further, the different layers 1-5 can have different colors. With the aid of the colors, the design of the three-dimensional protrusions can be considerably influenced. For instance, by means of dark colors, shadows can be represented, and the contour of the three-dimensional protrusions 10 can be particularly emphasized. For instance, the lowermost layer 1 can have the darkest layer. Further, the three-dimensional protrusions 10 can have different colors that the outer surface 12, 14, 16 of the storage device.

Since the layers are preferably printed, the colors can also be conveniently changed, and storage devices with differently colored three-dimensional protrusions can be produced in a simple manner.

Figure 5:
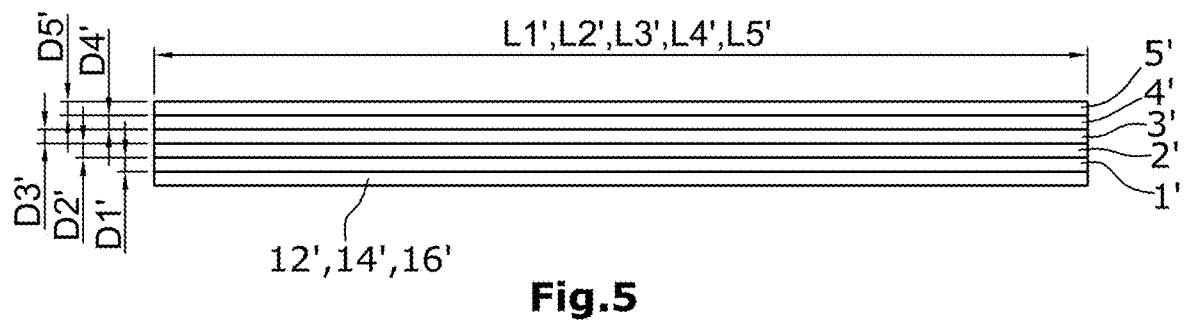
FIG. 5 shows the protrusions on the outer surface depicted in FIG. 4.

In FIG. 5, the three-dimensional protrusions of FIG. 4 are shown in lateral view. As can be gathered from FIG. 5, the lengths L1, L2, L3, L4, L5 of the layers 1-5 are identical. Further, the layers 1-5 shown in FIG. 5 and FIG. 4 have identical thicknesses D1, D2, D3, D4, D5.

However, the thicknesses D1-D5 and the lengths L1-L5 of the three-dimensional protrusions can also vary. The individual layers 1-5 can thus have different lengths L1-L5 and/or different thicknesses D1-D5. In this manner, slight variations can be performed on the design of the three-dimensional protrusion 10.

Figure 6:
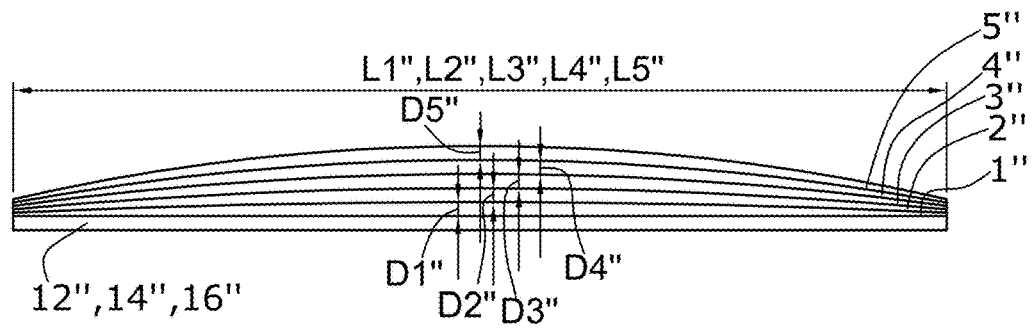
FIG. 6 shows an alternative embodiment of the three-dimensional protrusions.

In FIG. 6, an embodiment is shown wherein the thicknesses D1-D5 of the individual layers 1-5 varies along the length L1-L5. In the intermediate region of the rib-shaped, elongate three-dimensional protrusions, the thicknesses D1-D5 are considerably larger than in the edge regions. In this manner, the three-dimensional protrusion is gradually coming to an end toward the edge regions.

Figure 7:
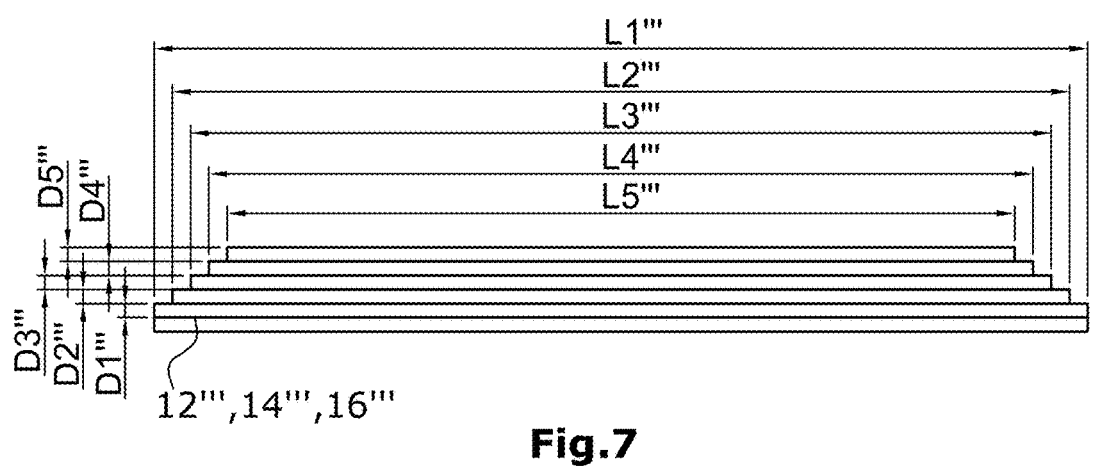
FIG. 7 shows a further alternative embodiment of the three-dimensional protrusions.

Alternatively, the individual layers 1-5 can also have different lengths L1-L5. Shown in FIG. 7 is an embodiment wherein the lowermost layer 1 has the largest length L1 and the uppermost layer 5 has the shortest length L5. The intermediate layers 2-4 have lengths L2-L4 which correspondingly are between the lengths L1 and L5.

The three-dimensional protrusion 10 shown in FIG. 7 is also is gradually coming to an end toward the edge regions.

Figure 8:
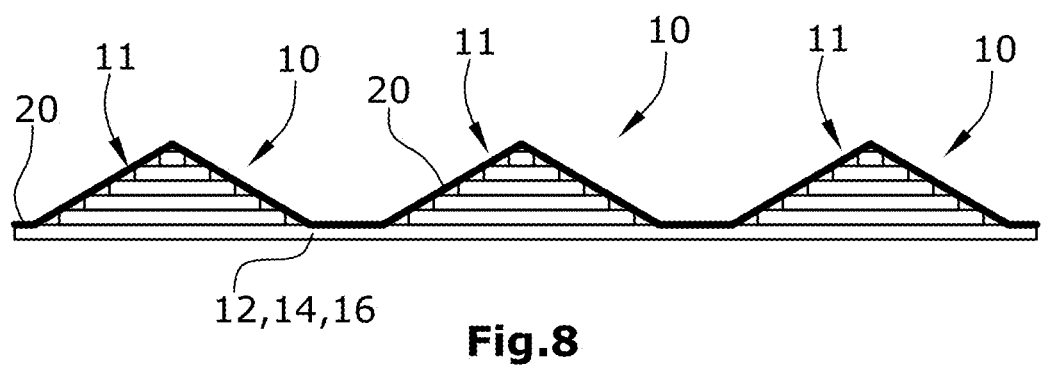
FIG. 8 shows three-dimensional protrusions provided with an additional outer layer.

FIG. 8 shows a further embodiment wherein, on the three-dimensional protrusions 10 and on the outer surface 12, 14, 16, an additional outer layer 20 is arranged. Said outer layer 20 comprises three-dimensional protrusions 11 which correspond to the three-dimensional protrusions 10. The additional outer layer 20 is arranged together with the three-dimensional protrusions 11 on the three-dimensional protrusions 10. The additional outer layer 20 is preferably fastened by means of an adhesive layer on the outer surface 12, 14, 16 and/or on the three-dimensional protrusions 10.

Figure 9:
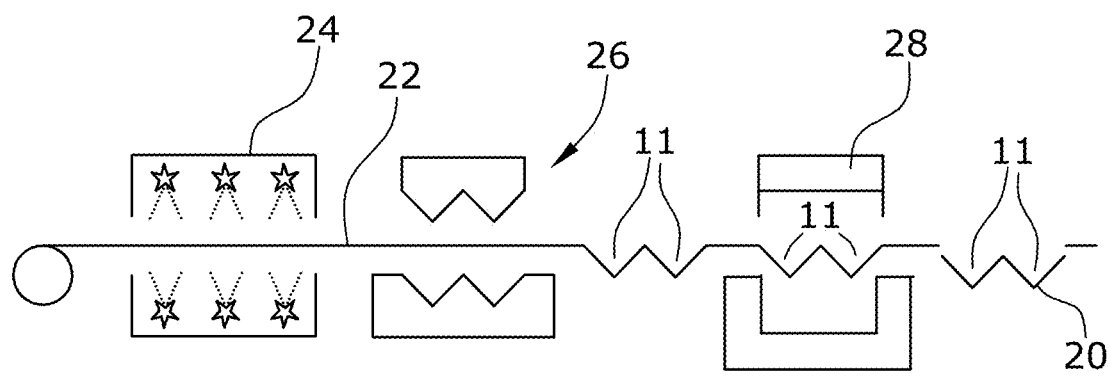
FIG. 9 shows a thermoforming plant for applying three-dimensional protrusions onto the outer layer.

The three-dimensional protrusions 11 of the additional outer layer 20 can already have been formed in the outer layer 20 prior to application on the outer surface 12, 14, 16 and the three-dimensional protrusions 10. This can be performed e.g. by means of a thermoforming method. In a thermoforming method, as shown in FIG. 9, a band-shaped layer 22 will be wound off a roll and be heated by means of a heating oven 24. Within a thermoforming device 26, the shape—in this case, the three-dimensional protrusion 11—will be molded in said band-shaped layer 22. In a punching device 28 following said thermoforming device 26, the band-shaped layer 22 will be divided into individual elements which in this case form the additional outer layer 20 and with respect to the outer dimensions correspond to the outer surface 12, 14, 16.

Alternatively, the thermoforming method can also be performed using plate articles. In this case, plates which already have a specific size will be individually heated and molded.

By means of said additional outer layer 20, the outer surface and/or the protrusions 10 can be provided with a high-quality coating.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A storage device, particularly a piece of baggage, said storage device comprising:
   at least one outer surface, wherein said at least one outer surface has arranged on it a plurality of three-dimensional protrusions extending from the outer surface, wherein
   said three-dimensional protrusions extending from the outer surface comprises at least two mutually superimposed and interconnected layers, wherein the at least two layers are stacked and joined and have varying widths matching the shape of a corresponding pre-formed additional outer layer protrusion,
   wherein said protrusions are rib-shaped and wherein the rib-shaped protrusions are arranged parallel next to each other at an equal distance running along the outer surface,
   wherein an additional outer layer is provided, the additional layer having at least one pre-formed additional outer layer protrusion, wherein the additional outer layer is affixed to the outer surface and the plurality of three-dimensional protrusions, and wherein the additional outer layer is arranged on the outer surface such that the plurality of three-dimensional protrusions are situated beneath the at least one pre-formed additional outer layer protrusion, and
   wherein at least one space is provided between the layers of the protrusions and the additional outer layer.

2. The storage device according to claim 1, wherein the protrusions extending from the outer surface are formed of at least two mutually superimposed and interconnected layers.

3. The storage device according to claim 1, wherein the layers of the protrusions are printed.

4. The storage device according to claim 1, wherein the protrusions comprise more than three mutually superimposed and interconnected layers which preferably are printed onto each other.

5. The storage device according to claim 1, wherein the layers comprise a material which further comprises silicone and a ceramic paste.

6. The storage device according to claim 1, wherein that layer of the protrusions which is adjacent to the outer surface is the lowermost layer, and that layer of the-protrusions which is most remote from the outer surface is the uppermost layer, the layers having different widths and the lowermost layer being wider than the uppermost layer.

7. The storage device according to claim 6, wherein the widths of a plurality of mutually superimposed layers decrease, preferably continuously, from the lowermost layer to the uppermost layer.

8. The storage device according to claim 1, wherein the layers are printed by offset printing or screen printing or by a 3D printing method.

9. The storage device according to claim 1, wherein the plurality of protrusions arranged on the outer surface, are positioned on the outer surface with uniform distribution.

10. The storage device according to claim 1, wherein the rib-shaped protrusions have a varying height in the longitudinal direction of the rib-shaped protrusions, the central area of the rib-shaped protrusions being higher than the edge areas of the rib-shaped protrusions.

11. The storage device according to claim 1, wherein the individual layer thicknesses of the rib-shaped protrusions are varying in the longitudinal direction of the rib-shaped protrusions.

12. The storage device according to claim 1, wherein said additional outer layer comprises at least one three-dimensional protrusion, applied by a thermoforming method, which is adapted to the three-dimensional protrusions arranged on the outer surface.

13. The storage device according to claim 1, wherein the storage device is a piece of baggage comprising two major surfaces and four lateral surfaces, at least one of the major surfaces comprising rib-shaped protrusions, and the longitudinal direction of the rib-shaped protrusions extending parallel to the longitudinal direction of the major surfaces.

* * * * *